UNITED STATES PATENT OFFICE.

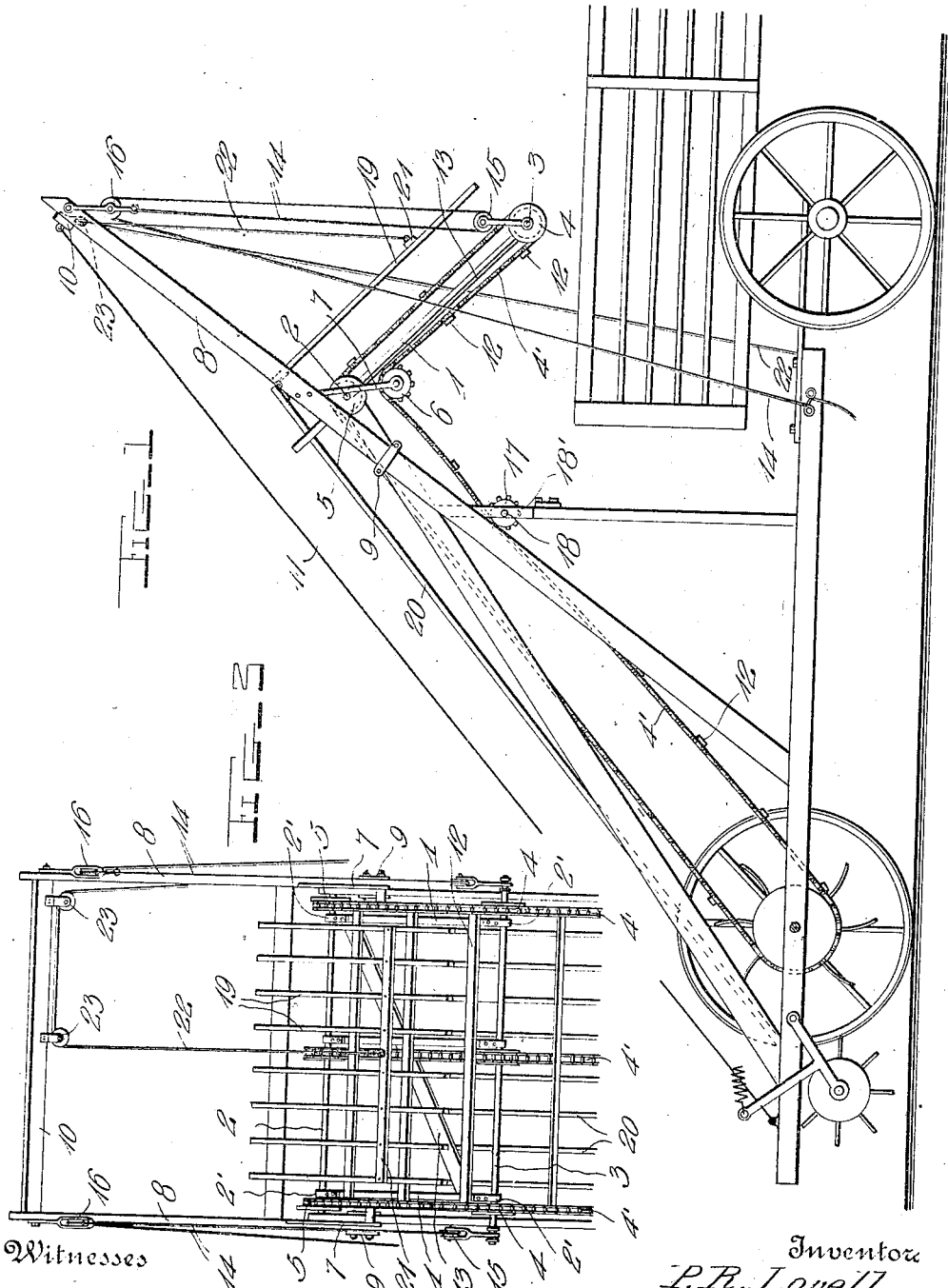

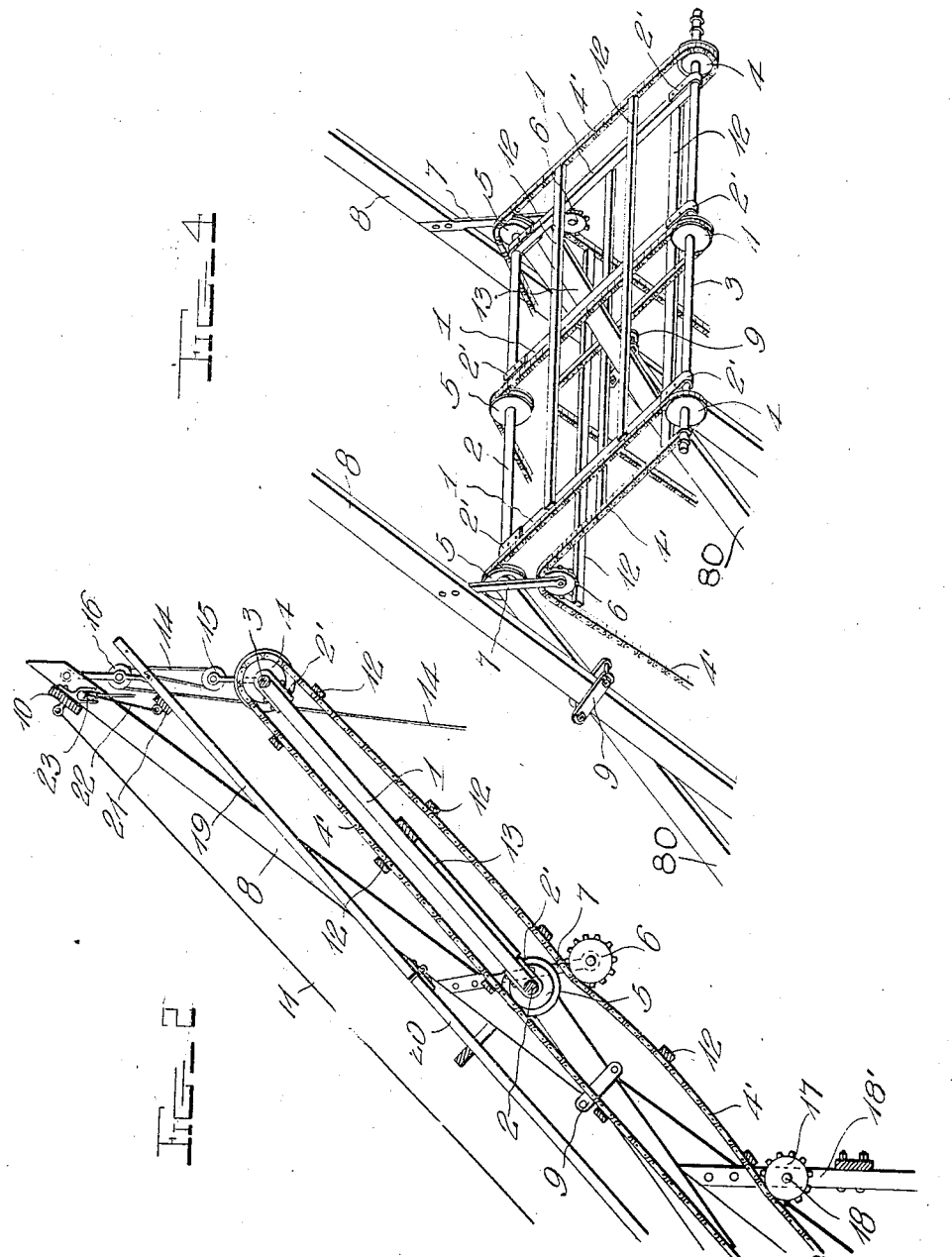

PAUL RUSSELL LOVELL AND ERNEST HENRY MICHAEL, OF LOGAN, IOWA.

ATTACHMENT FOR HAY-LOADERS.

1,017,433.      Specification of Letters Patent.    Patented Feb. 13, 1912.

Application filed August 31, 1911. Serial No. 647,112.

*To all whom it may concern:*

Be it known that we, PAUL RUSSELL LOVELL and ERNEST HENRY MICHAEL, citizens of the United States, residing at Logan, in the county of Harrison and State of Iowa, have invented certain new and useful Improvements in Attachments for Hay-Loaders; and we do declare the following to be a full, clear, and exact description of the invention, such as will enable others skilled in the art to which it appertains to make and use the same.

This invention is an attachment for the usual form of cylinder hay loader.

The objects of the invention are to provide hay loaders with improved means whereby the hay may be delivered at the center of the hay rack, is prevented from being drawn back by slack chains, is prevented from accumulating under the conveyer, is prevented from being blown back or sidewise when discharged on the rack, and may be loaded very high on the rack.

With these and other objects in view the invention consists of certain novel features of construction, and the combination and arrangement of parts as will be more fully described and claimed.

In the accompanying drawings: Figure 1 is a side view of a cylinder hay loader illustrating the application of the invention and showing the latter in an operative position; Fig. 2 is an enlarged vertical longitudinal sectional view of a portion of a loader showing the attachment in a raised or inoperative position; Fig. 3 is a rear view of the same with the attachment in a lowered or inoperative position; Fig. 4 is a perspective view of a portion of the conveyer frame of the loader showing the conveyer attachment engaged therewith and in an operative position.

Our attachment comprises an adjustable extension adapted to be applied to the upper end of the conveyer frame of the ordinary or any form of cylinder hay loader and consists of a series of bars 1 the inner ends of which are hingedly connected to the upper shaft 2 journaled in the upper ends of standards 80 of the conveyer mechanism of the loader. The bars 1 are preferably hingedly connected to the shaft 2 by U-shaped strap irons 2' and supported in a similar manner on the outer ends of the bars is a conveyer shaft 3. On the shaft 3 are revolubly mounted flanged pulley wheels 4 around which are adapted to pass the chains 4' of the conveyer mechanism of the loader, said chains being extended or increased in length to reach the pulley wheels 4. The upper stretches of the chains 4' pass over the usual flanged pulley wheels 5 on the shaft 2 of the conveyer mechanism of the loader and the lower stretches of the two outer chains 4' are supported by idle sprocket wheels 6 which are revolubly mounted in suitable supporting brackets 7 secured to and projecting at a suitable angle from inclined attachment supporting bars 8 which are secured at their lower ends to the main frame of the loader and are secured intermediate their ends to the sides of the conveyer frame of the loader by suitable brackets or hangers 9 as shown. The upper ends of the bars 8 project a suitable distance above the upper end of the conveyer frame of the loader and are connected together by a cross bar 10. The bars 8 are further braced and supported by inclined brace wires 11 which are secured at their upper ends to the upper ends of the bars 8 and at their lower ends to the frame of the loader as shown.

The conveyer chains 4' are connected together by the usual hay elevating slats 12 which are secured to the chains at suitable intervals and in the usual manner and serve to support the lower stretch of the middle chain 4' whereby an idler sprocket wheel 6 under the chain is dispensed with. The bars 1 of the extension are preferably secured together and braced by a diagonally arranged brace bar 13 disposed beneath the bars 1 and secured at one end to the inner end of one of said bars 1 and at its opposite end to the outer end of the opposite side bar 1 as shown. The conveyer extension when thus constructed and arranged is adapted to be raised and lowered and supported at the desired angle with respect to the upper end of the conveyer or elevating mechanism of the loader by means of elevating cables 14 which are engaged with pulleys 15 connected with the outer ends of the shaft 3 and with pulleys 16 secured to the upper ends of the supporting bars 8 as shown. The ends of the cables 14 when thus engaged with the pulleys extend down to within convenient reach of the operator and may be secured in any suitable manner to hold or support the outer end of the attachment at the desired elevation or angle or by means of which the attachment may be swung upwardly and secured in line with the conveyer mechanism of the loader, as shown in Fig. 2.

The lower stretches of the chains 4' after passing over the sprocket wheels 6 are preferably supported or held up by idle sprocket wheels 17 suitably mounted on a shaft 18 journaled in bearing brackets 18' secured to the side bars 8 whereby the slack in the lower stretches of the chain is taken up and the latter thus prevented from coming into engagement with the hay when loaded on the wagon. By thus constructing and arranging the attachment it will be seen that the same may be adjusted to deliver the hay at any desired elevation on the hay rack or loader and that as the size of the load increases the attachment may be raised thus permitting a much larger load to be formed.

In addition to the hay loading or distributing mechanism just described we also provide means for preventing the hay from being blown back or sidewise from the delivering attachment, said means comprising a series of compressor or protecting slats 19 which are hingedly connected at their inner ends to the upper ends of the compressor slats 20 of the loader and form a continuation or extension of said compressor slats. The extension slats 19 correspond in length to the length of the conveyer attachment and are connected together near their outer ends by a cross bar 21. The extension compressor slats 19 are adapted to be raised and lowered and supported in adjusted positions with respect to the conveyer attachment by means of an adjusting wire or cable 22 which is secured to the cross bar 21 and passed over a pulley 23 secured to the cross bar 10 of the supporting frame. By thus adjustably supporting the slats 19 they may be raised and held at the proper position above the conveyer attachment to prevent the hay from being blown off the attachment while being loaded and when the wind is not blowing or the slats 19 are not required the latter may be swung upwardly to an out of the way position in line with the main compressor slats 20 of the loader. By means of this attachment the delivery of the hay from the loader may be controlled and the hay discharged at the center of the rack and by adjusting the attachment, accumulation of hay beneath the elevating mechanism of the loader will be effectually prevented. The extension slats will effectually prevent the hay from being blown off the delivery end of the elevating mechanism when discharged onto the rack.

From the foregoing description taken in connection with the accompanying drawings, the construction and operation of the invention will be readily understood without requiring a more extended explanation.

Various changes in the form, proportion and the minor details of construction may be resorted to without departing from the principle or sacrificing any of the advantages of the invention as claimed.

Having thus described our invention, what we claim is:—

1. The combination with a main endless elevator belt and an extension thereof at its upper end adjustable to positions in line with or at an angle to the main belt, of compressor slats parallel with the main belt, and an extension comprising slats pivoted to the compressor slats at their upper ends and adjustable to maintain a parallel position with relation to the belt extension.

2. The combination with a frame, a supporting wheel and axle for the frame, sprocket wheels on the axle, uprights rising from the frame, a shaft journaled in the upper ends of the uprights, an endless elevator belt engaging the sprocket wheels and parallel compressor slats mounted above the belt, of an attachment pivotally connected on the shaft at the top of the uprights having sprocket wheels at its outer ends over which the endless belt of the conveyer is carried, a pivoted guard or compressor comprising slats in continuation of the compressor slats of the conveyer, pivoted to the upper ends of said conveyer slats, and means whereby the attachment and pivoted guard may be separately or simultaneously adjusted at any desired angle to or in alinement with the conveyer uprights.

3. The combination with a frame, two pairs of supporting uprights one of each pair rising from the frame on opposite sides and crossing each other above the frame, sprocket wheels at the bottom of the uprights, a shaft at the top of one of the uprights, sprocket wheels on the shaft, a frame journaled hingedly on the shaft, sprocket wheels mounted at the end of the hinged frame, an endless elevator belt passing under the lower first named sprocket, and the sprocket at the end of the hinged frame, and having its upper stretch passed over the sprockets at the top of one of the uprights, two brackets depending from the other upright and a shaft and sprocket journaled in each bracket to support the lower stretch of the endless belt.

In testimony whereof we have hereunto set our hands in presence of subscribing witnesses.

PAUL RUSSELL LOVELL.
ERNEST HENRY MICHAEL.

Witnesses:
CHAS. N. WOOD,
B. J. WOOD.